UNITED STATES PATENT OFFICE 2,644,124

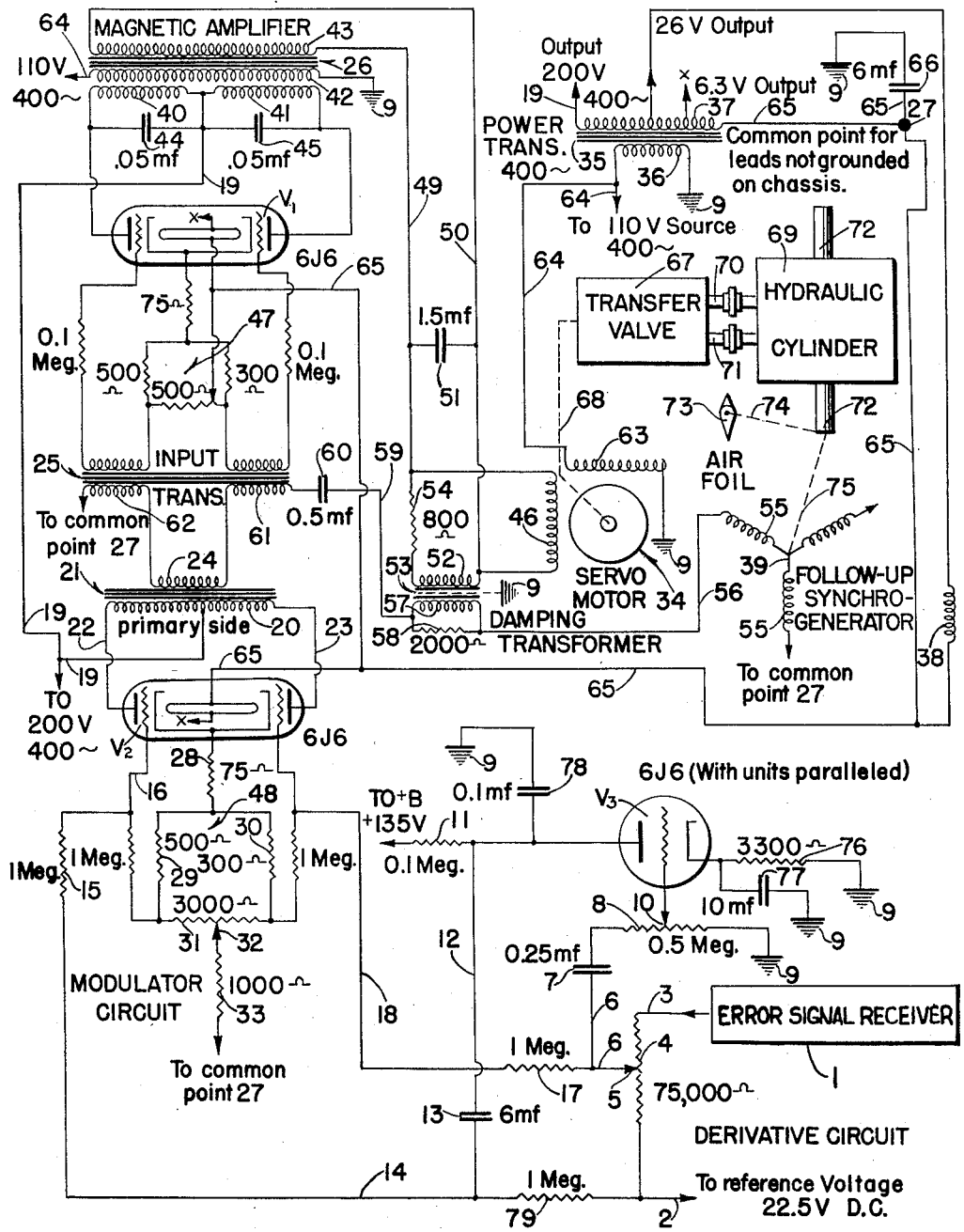

400 CYCLE ELECTROHYDRAULIC STEERING SYSTEM FOR GUIDED MISSILES

John H. Broadbent, Washington, D. C., and Harold E. Ober, Takoma Park, Md., assignors to the United States of America as represented by the Secretary of the Navy Application January 23, 1948, Serial No. 3,844

7 Claims. (Cl. 318—207)

The present invention relates to an electro-hydraulic steering servo system, and more particularly to one suitable for providing pitch and yaw controls for roll-stabilized guided missiles.

The principal object of the invention is to provide a process and device for operating a roll-stabilized missile having an electro-hydraulic steering servo system, to control pitch and yaw, which comprises receiving a radio-frequency control signal on said missile, producing therefrom a unidirectional but variable voltage, deriving from said voltage a second voltage which is a function of the rate of change of the first-named voltage, combining the first and second voltages in a desired ratio, amplifying the resulting composite voltage, and controlling the steering system thereby.

Another object of the invention is to provide pitch and yaw controls in such missiles, especially for a system that is to be operated by alternating current of a relatively high frequency, for example, 400 cycles per second.

The single figure, which constitutes the drawing, illustrates the circuits of either a pitch or a yaw control system diagrammatically and also indicates certain devices, controlled by said circuits, in block diagram.

One incidental object of the present invention is to provide steering systems so correlated with one another that a single compact and relatively light-weight power source may operate them all. A three-phase inverter, driven by storage batteries and operating at a comparatively high frequency, such as 400 cycles per second, is relatively small and light in proportion to its output power and thus is well adapted for use in missiles. Inasmuch as there are three control systems, namely, roll, pitch and yaw, such three-phase alternating current power is excellently adapted to energize the said three systems, each utilizing a separate single phase. The three-phase power also provides a convenient supply for actuating gyroscopes and similar apparatus.

As the pitch and yaw systems may be, and preferably are, identical, the same drawing will serve for both.

For convenience, each system may be considered as made up of several units, the most important of which is the derivative circuit, comprising the triode $V_3$ and the circuit components immediately associated therewith and shown at the lower right hand corner of the figure. This circuit receives the output from an error signal receiver 1 from the yaw or pitch channel thereof at its own input terminals 2 and 3, across which is connected a 75,000 ohm resistor 4, having a sliding contact 5 thereon, so that a desired portion of the voltage between leads 2 and 3 may be fed to the grids of tubes $V_3$ and $V_2$.

The tube $V_3$ in the derivative circuit is here preferably of the dual-triode type. However, because the second unit of this tube is not required in this circuit, tube $V_3$ has suitable connections in its socket to connect the corresponding elements of the two units in parallel, whereby $V_3$ acts as a simple triode and therefore is so shown. It will be understood that this is done solely for convenience and simplicity, so that $V_1$, $V_2$ and $V_3$ may all be of the same type to minimize the number of tube types.

From the shiftable contact 5, signal energy is supplied through conductor 6 and capacitor 7 to one end of resistor 8, the other end of which is grounded at 9. A contact 10 sliding on said last-named resistor will thus feed a desired portion of the signal variations to the grid of $V_3$. As long as a steady potential condition exists, no signal will be fed to the grid of $V_3$ from the conductor 6, because of the interposed capacitor 7. However, when the voltage of terminal 3 changes, a corresponding pulse will pass through capacitor 7 and a proportional part of the resultant voltage swing will be fed to the grid of $V_3$ from slider 10 on the resistor 8. A cathode resistor 76, shunted by a capacitor 77, may be provided to supply a suitable grid bias.

Direct current is supplied to the anode of $V_3$ from the positive terminal of a 135 volt source, a resistor 11, here shown as 100,000 ohms, being inserted in series therewith. To stabilize the anode circuit, a 0.1 mfd. capacitor 78 may be connected between the anode and ground 9, as shown. When a voltage pulse acts on the grid of $V_3$, the corresponding anode current change will cause a varying drop in resistor 11, and a pulse corresponding to this drop is fed through conductor 12, capacitor 13, conductor 14, resistor 15 and conductor 16, to the left-hand grid of $V_2$.

To the right hand grid of this tube $V_2$ is fed a unidirectional voltage determined by the position of slider 5 on resistor 4, which is thus a predetermined fraction of the variable voltage drop along resistor 4. This grid voltage is supplied through conductor 6, resistor 17 and conductor 18.

A power transformer 35 (shown near the upper right of the figure) having a primary winding 36 designed to operate on the available power supply, here one of the three phases of 110 volt 400 cycle current furnished by the inverter, supplies from its secondary winding 37, the proper voltages as indicated, namely 6.3 volts to supply the heaters of the triodes, 26 volts to energize the exciting winding 38 of the synchro-generator 39, and 200 volts to supply the anode circuits of the tubes V₁ and V₂. A suitable direct current source, not illustrated, is also present and supplies +22.5 volts to terminal 2, and +135 volts to the anode circuit of V₃, for example, the negative terminal of said source being grounded in the conventional manner.

Inasmuch as it is usually undesirable to conductively ground the secondary winding of transformer 35 at any point, what may be called the low potential terminal thereof is here shown as connected to the common point 27 through conductor 65. The said common point 27 itself is capacitatively connected to ground 9 through a capacitor 66 of relatively large capacity, as indicated.

It will be noted that the anodes of V₂ are energized through conductors 22 and 23 with 400 cycle current from the 200 volt conductor 19, which leads to the center tap of the primary winding 20 of the output transformer 21 of V₂. The secondary winding 24 thus has modulated 400 cycle current induced therein, which is fed to the input transformer 25 of V₁ and thence, through tube V₁, to the halves 40 and 41 of one winding of the magnetic amplifier 26.

The magnetic amplifier 26 consists essentially of a core of magnetic material carrying a plurality of windings, two of which act as ordinary alternating current transformer windings 42 and 43, while a third, consisting of the halves 40 and 41, is traversed by a variable but unidirectional current. This pulsating direct current has mainly the effect of varying the magnetic saturation of the core and thus causing the ratio of transformation of the alternating current windings to vary accordingly.

In the present case, the winding 42 is supplied, through wire 64, with alternating current from the power source, here shown as 110 volts at 400 cycles. The output winding 43 would thus normally yield 400 cycle current at a voltage which has a constant ratio to the voltage applied to winding 42, were it not for the effect of the center-tapped "direct-current" winding 40, 41. This last-named winding carries the anode currents of tube V₁, each anode circuit, of course, being conductive only during the positive half-cycle of the alternating anode voltage corresponding thereto. These respective anode currents, however, traverse the halves 40 and 41 of the direct current coil in such direction that their resultant magnetization of the core is always of the same polarity.

Capacitors 44 and 45 may be provided across the windings 40 and 41 to exert a stabilizing action, if desired.

In order to compensate for the usual unbalanced characteristics of the components of dual triodes such as V₂, the network 48 is provided, comprising resistors 29, 30 and 31 arranged as shown. The resistor 31 has a slider 32 thereon, connected to the common point 27 through resistor 33. An additional resistor 28 may be provided, to adjust the cathode bias. By giving suitable magnitudes, which in one instance had the values indicated, to the respective resistors, and by adjusting the slider 32, the accidental differences between the triode units may be "balanced-out." It may be mentioned incidentally that all those leads that are not grounded or otherwise specifically connected, preferably are brought together at a single common point 27, to stabilize their potentials.

The operation of the system depends largely upon the derivative circuit. This circuit acts to control the remainder of the system whenever the error signal, fed in at 3, varies; that is, whenever the missile carrying the system changes its orientation, due to yaw or pitch. As long as the error voltage remains constant, a direct current flows through resistor 4 and the voltage picked up by slider 5 cannot affect the potential of the grid of V₃, because of the blocking effect of capacitor 7.

When the signal changes, however, the voltage varies and thus corresponding pulses are produced, which can pass to the grid of V₃ through the capacitor 7, and thus will cause equivalent variations in the anode current of V₃. These variations in turn affect the left-hand grid of V₂ and raise or lower the value of the 22.5 volt reference voltage normally impressed on said grid from conductor 2, through resistor 79, thus introducing a first-derivative effect which is directly proportional to the rate of change of the signal.

The position of slider 10 on resistor 8 determines the derivative ratio with respect to the rate of change of signal. The resulting voltage fed to the left hand grid of V₂ thereby controls the current strength of the 400 cycle energy fed to transformer 21, and this, through the magnetic amplifier 26, energizes the "variable"-phase winding 46 of the two phase servomotor 34 which provides for adjustment of the steering means of the missile, to correct the deviation from its proper orientation. The "fixed"-phase winding 63 of said motor is supplied at the nominal 110 volts of the source, through conductor 64 and ground 9.

It may be remarked that compensation for accidental vibrations in the characteristics of the two component triodes of V₁ may be secured by the resistance network 47, similar in general to the compensating network 48 of dual triode V₂ already discussed. It should also be noted that where magnitudes of resistors and capacitors are indicated on the drawing, these are merely suggestive and in no sense to be considered as limitations, and similar remarks apply to the tube type designations.

In order to provide a general understanding of what is accomplished by the present control system, attention is directed to the circuit controlled by the output winding 43 of the magnetic amplifier 26. Through the conductors 49 and 50, which lead to the variable-phase winding 46 already mentioned, connection is made also to the primary winding 52 of a damping transformer 53, a resistor 54 being interposed, as shown. The capacitor 51, connected across leads 49 and 50, serves to adjust the phase relations, and/or assist in eliminating harmonics, in the variable-phase circuit.

A circuit is shown starting from the common point 27, through one of the windings 55 of the synchro-generator 39, the conductor 56, the secondary winding 57 of the damping transformer 53, shunted by the resistor 58, the conductor 59, the capacitor 60, the primary windings 61 and 62 of transformer 25, the secondary winding 24 of transformer 21, and back to the point 27.

This circuit is provided to prevent hunting or oscillation of the mechanism. It will be seen that winding 52, in series with resistor 54, is in parallel with the variable-phase winding 46 of the servomotor 34. Thus, whenever the output of the magnetic amplifier 26, delivered from conductors 49 and 50, drops to a value below that corresponding to the instantaneous rate of rotation of the servomotor, said motor will momentarily become a generator, and will deliver an induced voltage from its winding 46 to the primary winding 52 of the damping transformer.

This in turn induces a corresponding voltage in the secondary winding 57, which is then fed back into the primary windings 61 and 62 of the input transformer 25, the connections being made in such way that this constitutes an opposing feedback for the tube V₁. Hence whenever the motor 34 tends to rotate too fast, a correcting or damping impulse is provided automatically.

The servomotor 34 has the sole mechanical function of operating the hydraulic transfer valve 67, through any suitable mechanical connection 68, indicated by the dashed line. This valve in turn admits a hydraulic pressure fluid to one side or the other of a hydraulic cylinder 69, through the pipes 70 and 71, from a suitable source, not illustrated.

As a result, the piston of the hydraulic motor 69 will move the piston rod 72 up or down, according to the direction of rotation of the servomotor 34, and in so doing will turn the air foil 73 through the mechanical linkage 74 and at the same time will produce relative rotation between the windings 38 and 55 of the synchro-generator 39, through the mechanical connection 75.

A brief summary of the operation may be desirable here. Assuming that the missile is yawing and/or pitching, an error signal will enter at conductor 3, this signal being in the form of a unidirectional, but sometimes fluctuating, voltage supplied by a radio receiver carried by the missile. As long as this voltage is steady it produces no effect on the tube V₃, but it does affect the potential of the right-hand grid of tube V₂. This in turn changes the current in the primary side of transformer 21, which is fed through the right hand anode from the 400 cycle source. Consequently, as long as the error signal persists, alternating current energy will be supplied to the winding 46 of the servomotor, and said motor will operate. It will be noted that the winding 63 of this motor is energized at a constant alternating voltage from the winding 36 of the power transformer, whereas the other winding 46 receives, from the magnetic amplifier, an alternating voltage that not only varies in magnitude, but also in relative polarity, that is, it either leads or lags the voltage supplied from winding 36 by substantially 90°. Thus the rotation of the servomotor rotor is controlled as to both speed and direction in response to the voltage fed to the winding 46.

The derivative circuit responds to the same error signal, but said circuit derives an entirely different kind of output therefrom. As may be inferred from the preceding paragraph, whenever the error signal input to conductor 3 changes in voltage, the charge of capacitor 7 will readjust itself, and in so doing will provide a corresponding "transient" or pulse in the potential of the grid of V₃, which appears in amplified form in the anode circuit of V₃, and produces a corresponding variation in the voltage drop in resistor 11. This in a similar way "passes through" the capacitor 13 and to the left hand grid of V₂, causing the value of the 400 cycle anode current through the left half of transformer winding 20 to change in step therewith, this finally resulting in a change in the excitation of winding 46 of the servomotor. This component of the excitation is, however, a function of the rate of change of the error signal and not of the error signal itself. In this way, it is anticipatory of the steering needs, and provides a quicker and more nearly correct response of the steering vane or air foil 73.

The damping transformer 53 also assists in this, as already explained, by providing what amounts to an inverse feed-back when the servomotor speed is excessive, thus also preventing hunting.

While the present disclosure relates specifically to that embodiment of the invention currently preferred, it should be understood that the details given are to be considered merely as illustrative of the invention, and in no sense constitute limitations thereof. The invention is defined solely in and by the following claims.

We claim:

1. In a control servo-system having a two-phase alternating current motor including a rotor and fixed and variable phase windings, means for energizing said motor, including a constant voltage alternating current source connected to said fixed phase winding of said motor, a magnetic amplifier having an output winding connected to said variable phase winding of said motor, and phase adjusting means also connected to said variable phase winding of said motor, said magnetic amplifier including an output transformer having a direct current winding superimposed on its alternating current winding; in combination, a multi-stage electronic amplifier having an interstage transformer, said electronic amplifier having its output side connected to said direct current winding of said magnetic amplifier, said electronic amplifier being driven by difference in an error signal voltage and a reference voltage, a derivative circuit operatively associated with the input side of said electronic amplifier, said circuit including a thermionic tube having an anode, a control electrode and a capacitor connected in series with said control electrode, an error signal source for determining an error signal voltage, a circuit for supplying said error signal voltage to said derivative circuit, gain control means feeding a desired fractional part of said error signal voltage to the control electrode of said thermionic tube from said capacitor, a load connected to the anode of said thermionic tube to provide an output respresentative of the variations of said error signal voltage, and a connection to superimpose said variations on said reference voltage in order to feed such output to the input side of said electronic amplifier.

2. An arrangement as set forth in claim 1, and anti-hunting means comprising a damping transformer having one winding connected to receive a voltage proportional to the voltage applied to the variable phase winding of the motor and a second winding connected to said interstage transformer to feed said voltage back degeneratively into said electronic amplifier proportional to the back electromotive force generated whenever the rotor of the motor is rotating at an excessive speed.

3. In a servo-system having a two-phase alternating current motor having a rotor and fixed and variable phase windings, means for energizing said motor, including a constant voltage alternating current source connected to said fixed phase winding of said motor, a magnetic amplifier having an output winding connected to said variable phase winding of said motor, and phase adjusting means also connected to said variable phase winding of said motor, said magnetic amplifier including an output transformer having a direct current winding superimposed on its alternating current windings; in combination, a multi-stage electronic amplifier having an interstage transformer, said electronic amplifier having its output side connected to said direct current winding of said magnetic amplifier, said electronic amplifier being driven by difference in an error signal voltage and a reference voltage, a derivative circuit operatively associated with the input side of said electronic amplifier, said circuit including a thermionic tube having an anode, a control electrode and a capacitor connected in series with said control electrode, an error signal source for determining said error signal voltage, a circuit for supplying said error signal voltage to said derivative circuit, gain control means feeding a desired fractional part of said error signal voltage to said control electrode of said thermionic tube from said capacitor, a load connected to the anode of said thermionic tube to provide an output representative of the variations of said error signal voltage, and a connection to superimpose said variations on said reference voltage in order to feed such output to the input side of said electronic amplifier.

4. An arrangement as set forth in claim 3, and anti-hunting means comprising a damping transformer having one winding connected to receive a voltage proportional to the voltage applied to the variable phase winding of the motor and a second winding connected to said interstage transformer to feed said voltage back degeneratively into said electronic amplifier proportional to the back electromotive force generated whenever the rotor of the motor is rotating at an excessive speed.

5. A control servo-system, comprising, a two-phase alternating current motor having a rotor and fixed and variable phase windings, means for energizing said motor, including a constant voltage alternating current source connected to said fixed phase winding of said motor, a magnetic amplifier having an output winding connected to said variable phase winding of said motor, phase adjusting means also connected to said variable phase winding of said motor, said magnetic amplifier including an output transformer having a direct current winding superimposed on its alternating current windings, a multi-stage electronic amplifier having an interstage transformer, said electronic amplifier having its output side connected to said direct current winding of said magnetic amplifier, said electronic amplifier being driven by difference in an error signal voltage and a reference voltage, a derivative circuit operatively associated with the input side of said electronic amplifier, said circuit including a thermionic tube having an anode, a control electrode and a capacitor connected in series with said control electrode, an error signal source, a circuit for supplying said error signal voltage to said derivative circuit, gain control means feeding a desired fractional part of said error signal voltage to the control electrode of said thermionic tube from said capacitor, a load connected to said anode of said thermionic tube to provide an output representative of the variations of said error signal voltage, a connection to superimpose said variation on said reference voltage, in order to feed such output to the input side of said electronic amplifier, an anti-hunting means comprising a damping transformer having one winding connected to receive a voltage proportional to the voltage applied to the variable phase winding of the motor and a second winding connected to said interstage transformer to feed said voltage back degeneratively into said electronic amplifier proportional to the back electromotive force generated whenever the rotor of the motor is rotating at an excessive speed.

6. In combination, an electronic amplifier arrangement for controlling a servo-system, said electronic amplifier being driven by the difference in an error signal voltage and a reference voltage, a derivative circuit operatively associated with the input side of said electronic amplifier, said circuit including a thermionic tube having an anode, a control electrode and a capacitor connected in series with said control electrode thereof, an error signal source, a circuit for supplying said error signal voltage to said derivative circuit, gain control means for feeding a desired fractional part of said signal to the control electrode from said capacitor, a load connected to said anode of said thermionic tube to provide an output representative of the variations of said error signal, and a connection to superimpose said variations on said reference voltage in order to feed said output to the input side of said electronic amplifier.

7. A servo-system, comprising, a two-phase alternating current motor having a rotor and fixed and variable phase windings, means for energizing said motor, including a constant voltage alternating current source connected to said fixed phase winding, a magnetic amplifier having an output winding connected to said variable phase winding of said motor, phase adjusting means also connected to said variable phase winding of said motor, said magnetic amplifier including an output transformer having a direct current winding superimposed on its alternating current windings, a multi-stage electronic amplifier having its output side connected to said direct current winding of said magnetic amplifier, said electronic amplifier being driven by difference in an error signal voltage and a reference voltage, a derivative circuit operatively associated with the input side of said electronic amplifier, said circuit including a thermionic tube having an anode, a control electrode and a capacitor connected in series with said control electrode, an error signal source, a circuit for supplying said error signal to said derivative circuit, gain control means for feeding a desired fractional part of said signal to the control electrode of said thermionic tube from said capacitor, a load connected to the anode of said thermionic tube to provide an output representative of the variations of the error signal, a connection to superimpose said variations on said reference voltage in order to feed such output to the input side of said electronic amplifier, and anti-hunting means having a damping transformer with one winding connected to receive a voltage proportional to the voltage applied to the variable phase winding of the motor and a second winding connected to said interstage transformer to feed said voltage back degeneratively into the electronic amplifier proportional to the back electromotive force generated whenever the rotor of the motor is rotating at an excessive speed, whereby said servo-system tends to reduce said error to a minimum.

JOHN H. BROADBENT.
HAROLD E. OBER.

(References on following page)

References Cited in the file of this patent

UNITED STATES PATENTS

| Number | Name | Date |
|---|---|---|
| 1,973,279 | Bernarde | Sept. 11, 1934 |
| 2,068,490 | Hull | Jan. 19, 1937 |
| 2,088,654 | Hull | Aug. 3, 1937 |
| 2,131,481 | O'Connor | Sept. 27, 1938 |
| 2,312,748 | Broos | Mar. 2, 1943 |
| 2,317,383 | Hull | Apr. 27, 1943 |
| 2,398,421 | Frische et al. | Apr. 16, 1946 |
| 2,403,917 | Gille | July 16, 1946 |
| 2,423,336 | Moseley | July 1, 1947 |
| 2,429,642 | Newton | Oct. 28, 1947 |
| 2,434,259 | Burton | Jan. 13, 1948 |
| 2,443,347 | Field | June 15, 1948 |
| 2,451,917 | Chilowsky | Oct. 19, 1948 |
| 2,455,646 | Beard et al. | Dec. 7, 1948 |
| 2,459,457 | Sanders | Jan. 18, 1949 |

OTHER REFERENCES

Publication, McNaney, "Continuous-Control Servo System."
Electronics, December 1944, pages 119–125.